United States Patent
Nogi et al.

(10) Patent No.: US 7,128,051 B2
(45) Date of Patent: Oct. 31, 2006

(54) INTERNAL COMBUSTION ENGINE, AND CONTROL APPARATUS AND METHOD THEREOF

(75) Inventors: Toshiharu Nogi, Hitachinaka (JP); Takuya Shiraishi, Hitachinaka (JP); Minoru Ohsuga, Hitachinaka (JP); Yoko Nakayama, Hitachinaka (JP); Noboru Tokuyasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/948,666

(22) Filed: Sep. 24, 2004

(65) Prior Publication Data

US 2005/0034706 A1   Feb. 17, 2005

Related U.S. Application Data

(63) Continuation of application No. 10/134,456, filed on Apr. 30, 2002, now abandoned, which is a continuation of application No. 09/623,272, filed as application No. PCT/JP98/01192 on Mar. 19, 1998, now abandoned.

(51) Int. Cl.
*F02D 9/10* (2006.01)
*F02D 13/00* (2006.01)

(52) U.S. Cl. .................. 123/336; 123/346; 123/348
(58) Field of Classification Search ........ 123/345–348, 123/336, 435, 436; 73/118.2
See application file for complete search history.

(56) References Cited

U.S. PATENT DOCUMENTS

| 4,494,506 A | * | 1/1985 | Hayama et al. ............. 123/348 |
| 4,719,890 A | * | 1/1988 | Wataya et al. ............. 73/118.2 |
| 4,995,351 A | | 2/1991 | Ohkubo et al. ........... 123/90.11 |
| 5,022,357 A | * | 6/1991 | Kawamura .................. 123/348 |
| 5,146,888 A | * | 9/1992 | Sawamoto .................. 123/336 |
| 5,377,654 A | | 1/1995 | LoRusso et al. ............ 123/673 |
| 5,666,916 A | * | 9/1997 | Fujieda et al. .............. 123/295 |
| 5,690,065 A | * | 11/1997 | Janse van Vuuren .... 123/90.16 |

FOREIGN PATENT DOCUMENTS

| JP | 55-42247 | 10/1980 |
| JP | 60-116842 | 6/1985 |
| JP | 1-104928 | 4/1989 |
| JP | 3-164537 | 7/1991 |
| JP | 4-183942 | 6/1992 |
| JP | 4-219427 | 8/1992 |
| JP | 5-106505 | 4/1993 |
| JP | 6-26314 | 2/1994 |
| JP | 6-117283 | 4/1994 |
| JP | 6-213044 | 8/1994 |
| JP | 6-272580 | 9/1994 |
| JP | 7-4302 | 1/1995 |
| JP | 7-133742 | 5/1995 |
| JP | 7-229441 | 8/1995 |
| JP | 8-232694 | 9/1996 |
| JP | 10-37727 | 2/1998 |
| JP | 10-110647 | 4/1998 |

* cited by examiner

*Primary Examiner*—Andrew M. Dolinar
(74) *Attorney, Agent, or Firm*—Crowell & Moring LLP

(57) ABSTRACT

The amount of air to be introduced is controlled for each cylinder, whereby it is intended to make it possible to control the torque generated in each cylinder, perform an ultra-lean burn operation, purify the exhaust gas, and increase the output of an engine. An air flow control valve adapted to be on-off controlled in accordance with an operated quantity of an accelerator pedal is disposed in each branch pipe or intake port. The air flow control valve may be a throttle valve disposed in each branch pipe or it may be a variable intake valve for opening and closing the intake port.

5 Claims, 24 Drawing Sheets

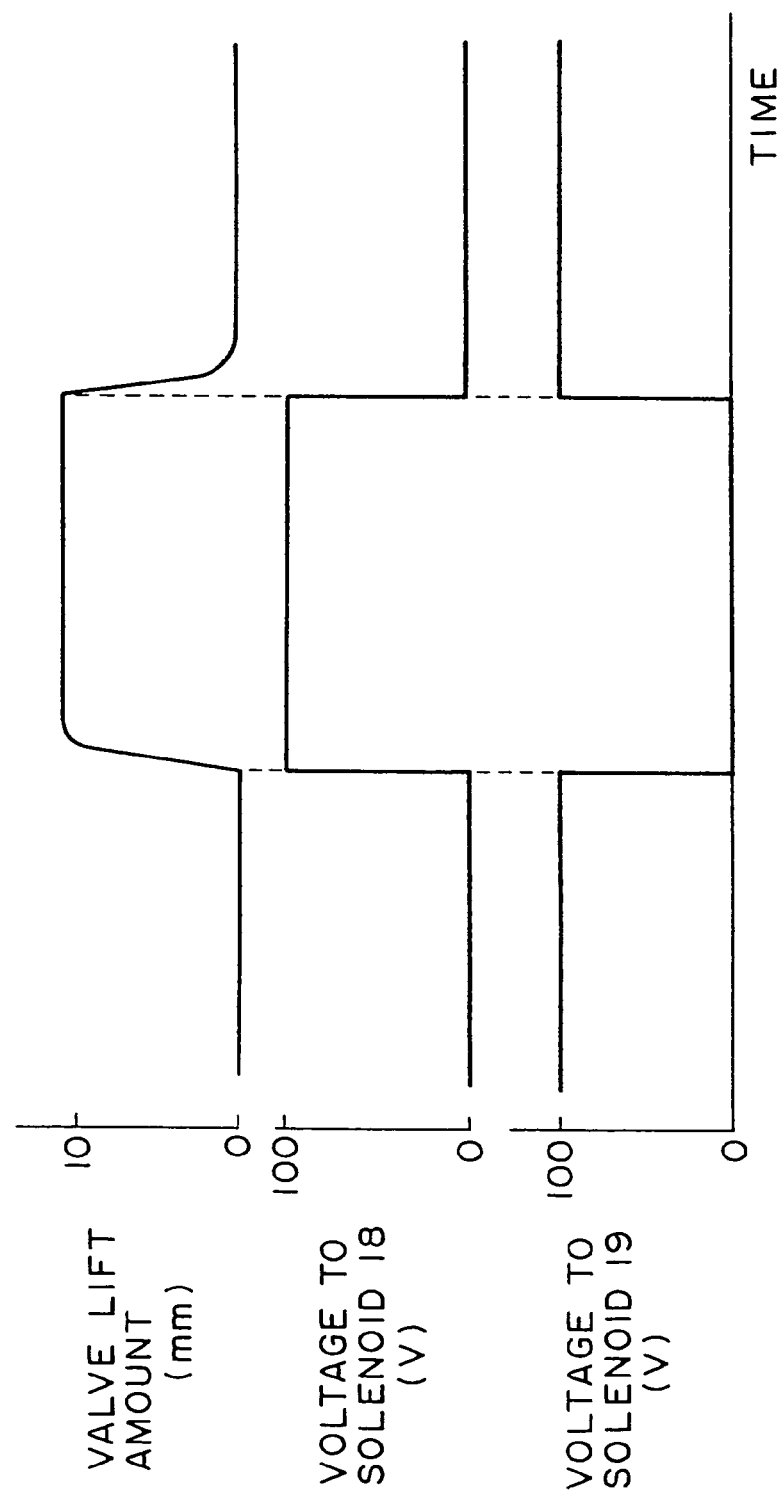

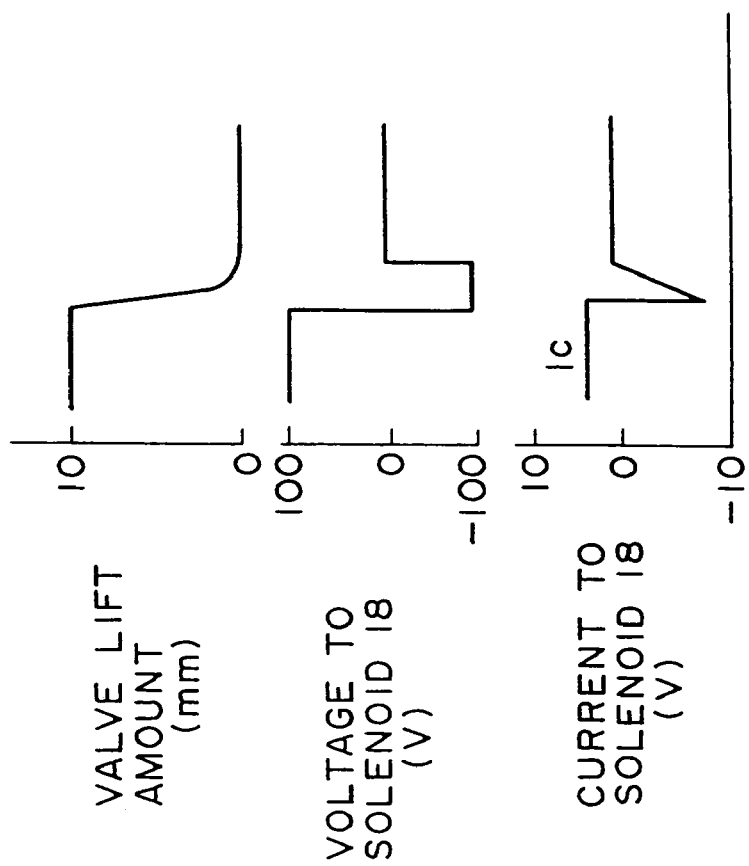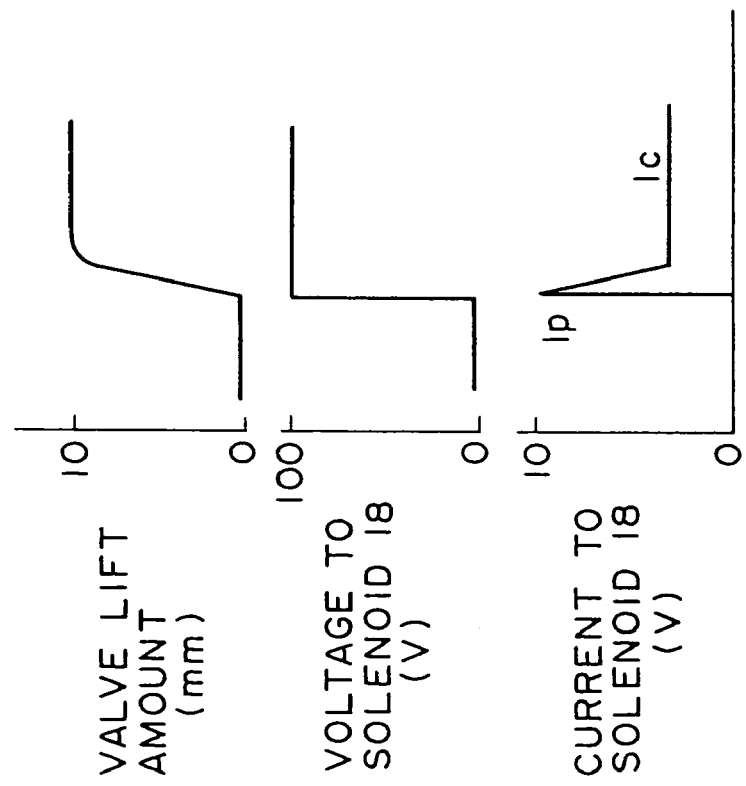

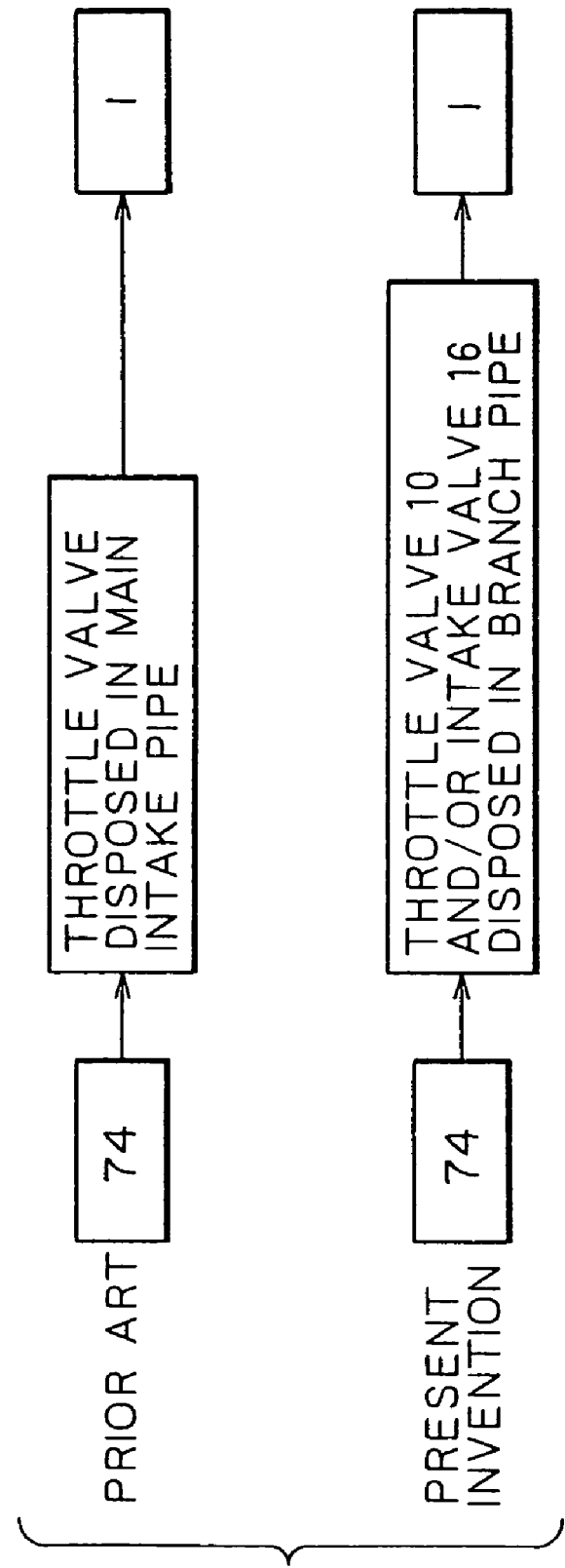

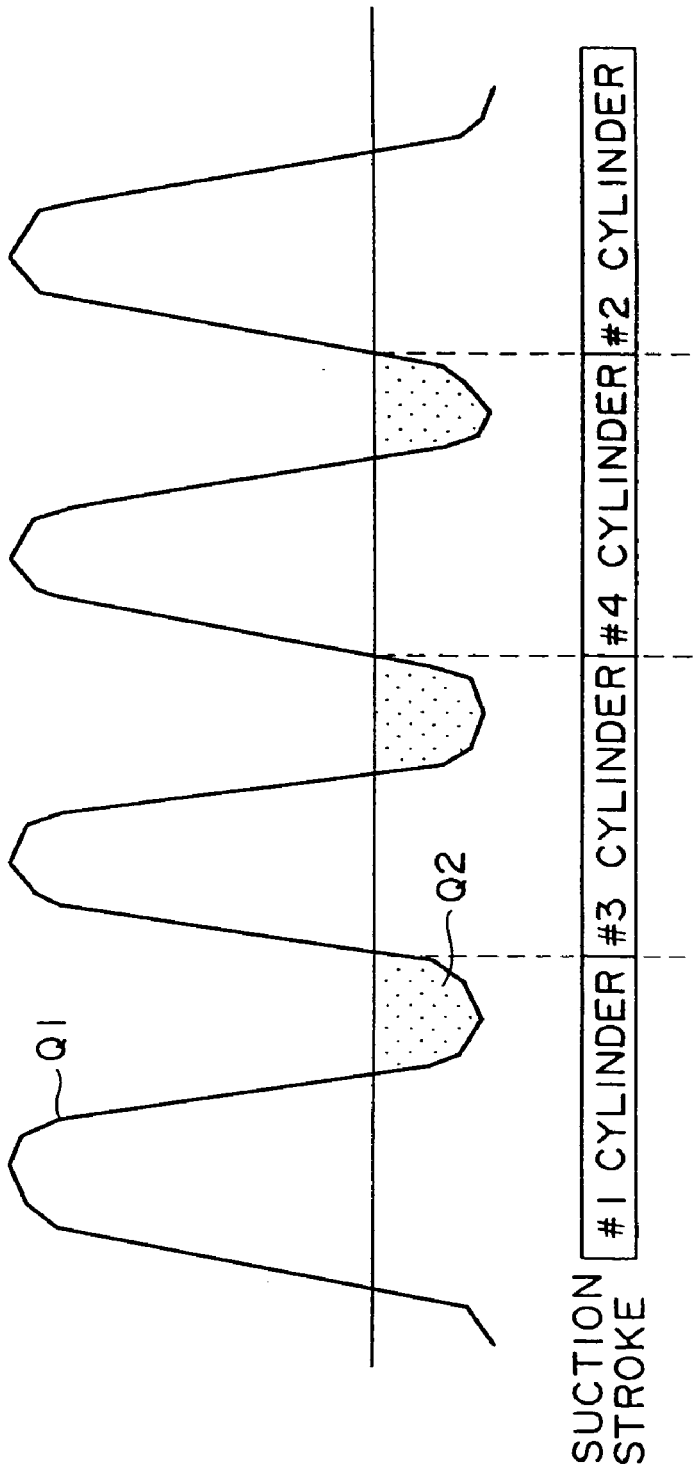

F I G.16
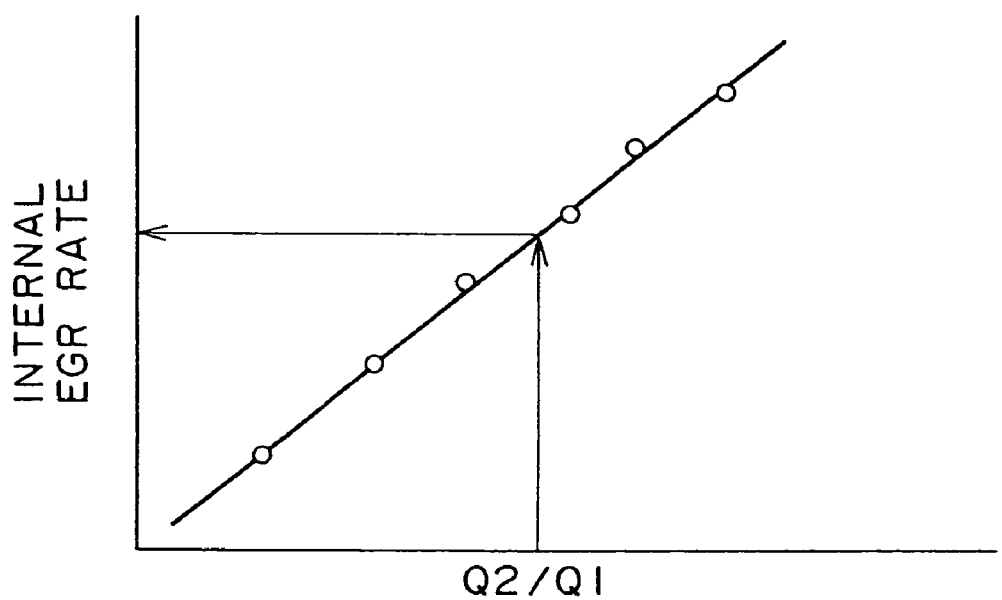

INTERNAL COMBUSTION ENGINE, AND CONTROL APPARATUS AND METHOD THEREOF

This application is a continuation of application Ser. No. 10/134,456, filed Apr. 30, 2002 now abandoned, which is a continuation of application Ser. No. 09/623,272, filed Aug. 31, 2000 now abandoned, which is a 371 of PCT/JP98/01192, filed Mar. 19, 1998.

TECHNICAL FIELD

The present invention relates to an apparatus and method for controlling an internal combustion engine, capable of adjusting the amount of air to be fed to each cylinder in accordance with an operated quantity of an accelerator pedal.

The present invention is also concerned with an internal combustion engine itself.

BACKGROUND ART

In a conventional internal combustion engine, an air flow control valve called a throttle valve is disposed in a main intake pipe, and this throttle valve is on-off controlled, for example, in accordance with a displacement of an accelerator pedal and is branched downstream into branch pipes connected to cylinders.

In a control apparatus for an internal combustion engine which is known in Japanese Patent Laid Open No. Hei 1-271634 for example, in addition to the above configuration, the fuel injection volume is adjusted so as to eliminate a difference in output torque for each cylinder detected by a crank angle sensor and it is compensated in response to a pressure variation detected by an internal cylinder pressure sensor.

In the above prior art, the air passage length from the throttle valve to each cylinder is too long and there occurs a delay in a change of air volume controlled by the throttle valve, thus giving rise to a problem that it is impossible to obtain an optimum air volume for each cylinder. There also has been a problem that the branch pipes connected to cylinders are different in length and shape, thus making it impossible to distribute air uniformly to the cylinders.

Thus, since the amount of air required for each cylinder cannot fed accurately, even if the amount of fuel is controlled for each cylinder, it has so far been impossible to accurately control the output torque for each cylinder.

Due to consequent unevenness in torque for each cylinder, the output of the entire internal combustion engine is lowered and a limit has so far encountered in fuel economy improving measures or emission improving measures, such as lean burn control, ultra-lean burn control, and cylinder-direct fuel injection control.

DISCLOSURE OF INVENTION

The present invention has been accomplished for solving the above-mentioned problems and it is the first object of the invention to make it possible to control the amount of intake air for each cylinder in an internal combustion engine.

It is the second object of the present invention to make it possible to control the output torque for each cylinder in an internal combustion engine.

It is the third object of the present invention to diminish a pumping loss between an air flow control valve and each cylinder and/or eliminate unevenness in air distribution caused by the difference in shape of branch pipes.

It is the fourth object of the present invention to make it possible to control the amount of air to be fed to each cylinder more accurately in response to the amount of operation (say, displacement) of an accelerator pedal.

It is the fifth object of the present invention to make it possible to accurately control the amount of exhaust gas to be recirculated in an internal combustion engine provided with an exhaust gas recirculation system (EGR system).

The above first object is achieved by disposing an air flow control valve in each of branch pipes branched from a main intake pipe or in an intake port of each cylinder, the air volume control valve controlling the amount of intake air in response to an operated quantity of an accelerator pedal.

The second object is achieved by providing an air flow control valve for each cylinder to control the amount of intake air and by compensating the degree of opening of the air flow control valve in accordance with a required output torque for each cylinder.

The third object is achieved by controlling an opening/closing timing or stroke of an intake valve which is for opening and closing an intake port of each cylinder and thereby controlling the amount of intake air for each cylinder.

The fourth object is achieved by disposing a throttle valve in each branch pipe or intake port, the throttle valve being controlled its opening and closing motions in accordance with an operated quantity of an accelerator pedal.

The fifth object is achieved by providing a reverse flow detection type air flow sensor capable of detecting the amount of air flowing through each branch pipe, including the amount of air reverse-flowing through each branch pipe and by controlling an opening/closing timing of an intake valve disposed in an intake port of each cylinder.

BRIEF DESCRIPTION OF DRAWINGS

FIG. 8 is a time chart for explaining how to actuate the variable valve.

FIGS. 10A and 10B are diagrams for explaining a further method for actuating the variable valve.

FIG. 11 is a diagram for explaining the present invention and the prior art in a comparative manner.

FIG. 14 is a diagram showing signal waveforms in a reverse flow detection type air flow meter.

FIG. 16 is a diagram for explaining a relation between signals in the air flow meter and an internal EGR rate.

BEST MODE FOR CARRYING OUT THE INVENTION

Embodiments of the present invention will be described below with reference to the drawings.

Figure 1:
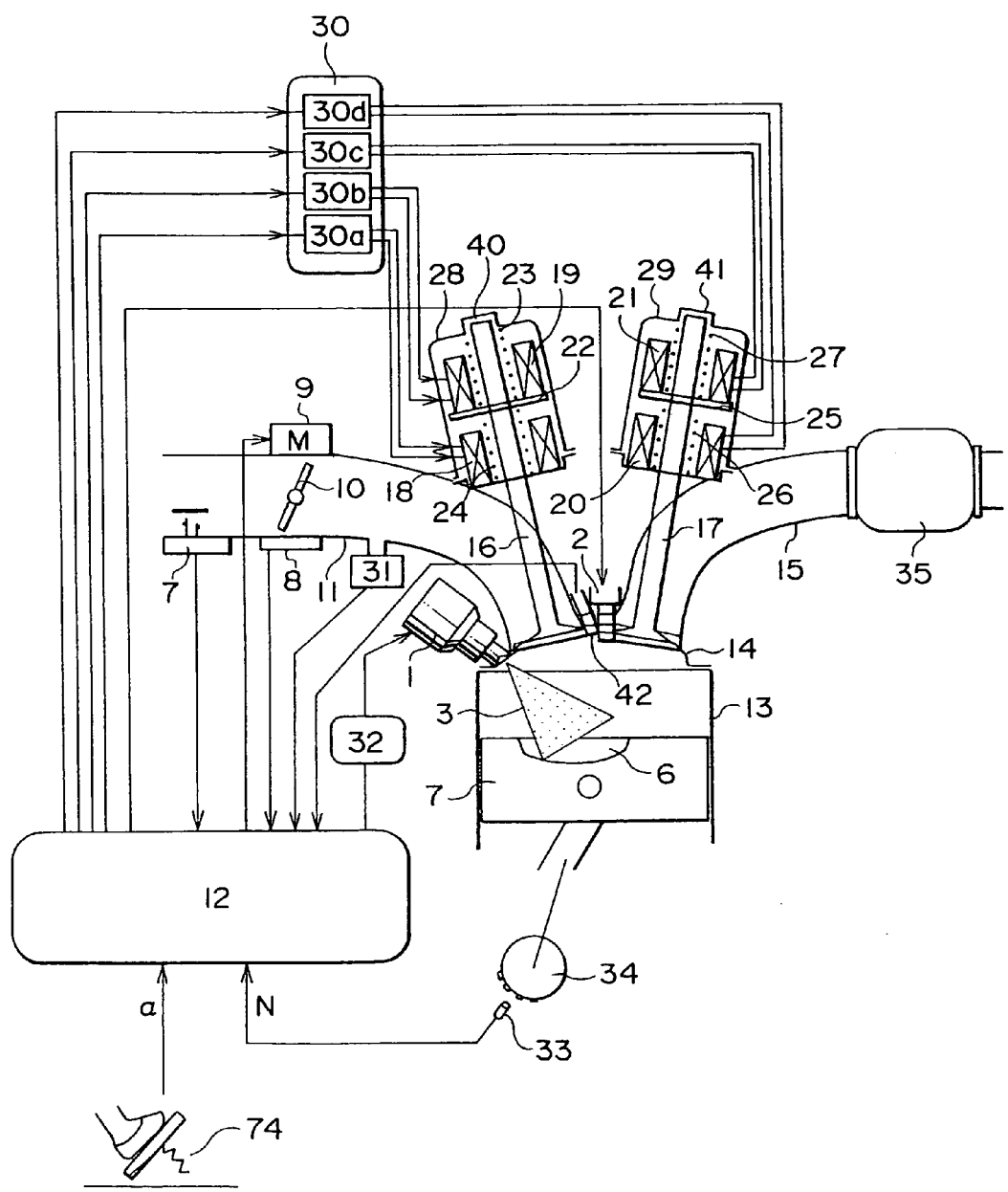
FIG. 1 is a system diagram according to the present invention.

FIG. 1 illustrates a configuration of the present invention. Air is introduced into an engine 13 through an air flow sensor 7, a throttle valve 10, a branch pipe 11, and an intake valve 16 in each cylinder. The amount of air can be controlled by changing the degree of opening of the throttle valve 10 and that of the intake valve 16 and it is metered by the air flow sensor 7. Where required, an internal pressure of an intake pipe and that of each cylinder are detected by means of an internal intake pipe pressure sensor 31 and an internal cylinder pressure sensor 42, respectively. As to the intake valve 16, a movable portion 22 operates under the action of an electromagnetic force induced by applying a voltage to electromagnetic solenoids 18 and 19 through a drive circuit 30, and the intake valve 16, which is connected to the movable portion 22, operates in its opening or closing direction. Also as to an exhaust valve 17, a similar operation is performed. Fuel is fed from an injector 1 which is driven by a drive circuit 32 and which can inject fuel directly into the cylinder. The throttle valve 10 is opened and closed by a motor 9 and the degree of opening thereof is detected by a throttle sensor 8. An accelerator pedal opening α is detected by an accelerator opening sensor 74, and intake/exhaust valves are controlled at least in accordance with an accelerator opening sensor signal. A controller 12 controls the throttle valve and the intake/exhaust valves in accordance with the signal provided from the said sensor. The branch pipe 11, which branches from a main intake pipe, is a passage for feeding air to an intake port in each cylinder.

Figure 2:
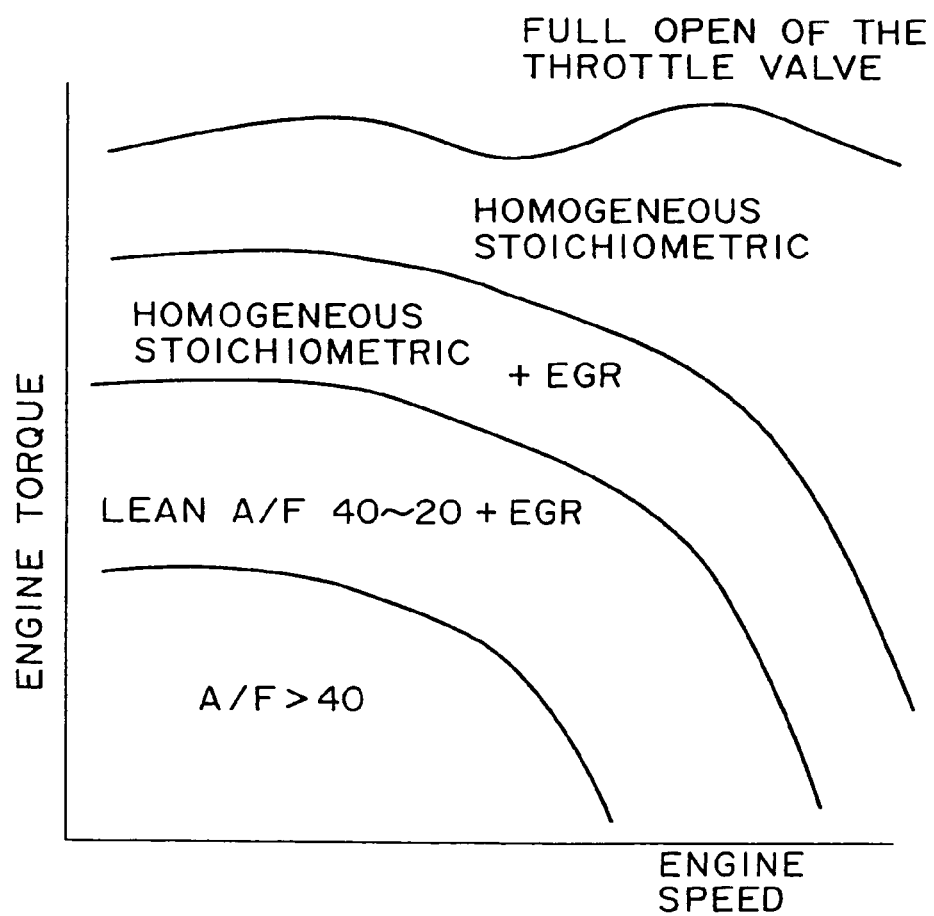
FIG. 2 is an air/fuel ratio map in an internal combustion engine.

In an operational region wherein the engine speed is low and the engine torque is small, as shown in FIG. 2, there is adopted such an ultra-lean burn operation as 40 in terms of air/fuel ratio for the improvement of fuel economy. As the engine torque increases, there is made a control for lean burn (smaller than 40; say, 20~30) plus EGR, and with a further increase of the engine torque, EGR is added to a stoichiometric air/fuel ratio. As the output becomes still larger, the air/fuel ratio is set at a stoichiometric or even higher ratio.

By EGR, not only the combustion temperature is reduced, but also the consumption of fuel and the amount of NOx discharged are decreased.

Figure 3:
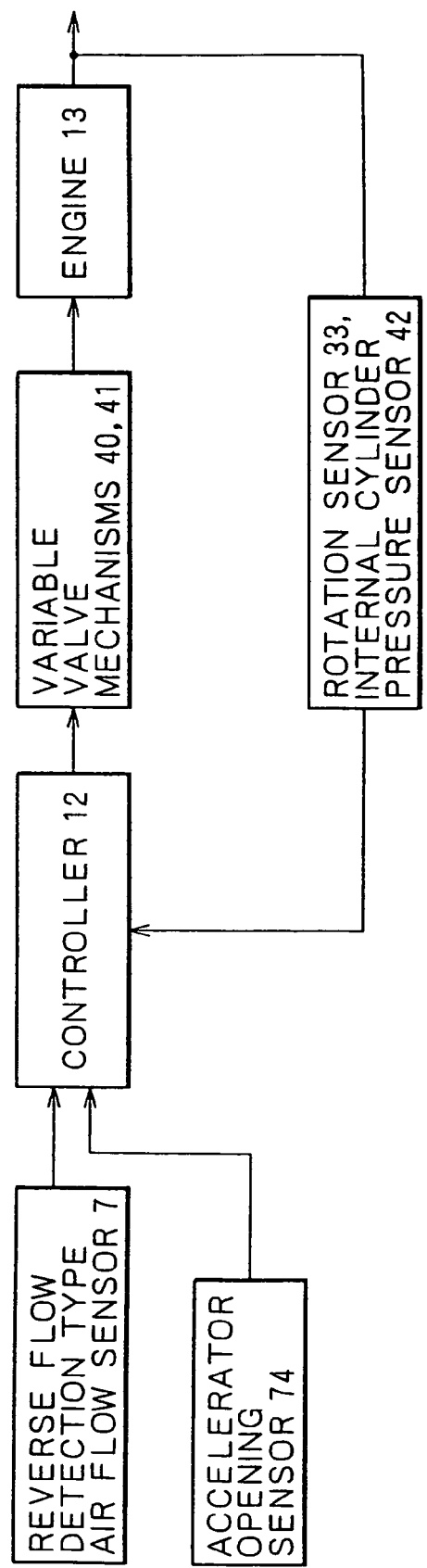
FIG. 3 is a block diagram for explaining a principle of the present invention.

FIG. 3 shows a basic configuration of the present invention. In accordance with a signal provided from the air flow sensor 7 the controller 12 controls an air flow control valve (variable intake valve) mechanism 40, detects an output torque of the engine on the basis of signals provided from a rotational angle sensor 33 in the engine and also from an internal cylinder pressure sensor 42, and make a feedback control using the detected output torque.

In this embodiment, in the case where the throttle valve 10 as an air control valve for controlling the flow rate of air is provided in each branch pipe 11 and is controlled in accordance with an operated quantity (displacement) of the accelerator pedal, the intake valve 16 may be controlled by a mechanical cam mechanism.

Even where the intake valve 16 is actuated electromagnetically, the air flow control may be taken charge of by only the throttle valve 10 while controlling the intake valve 16 merely as an ON-OFF valve.

Conversely, in a low load, low speed operation region, the throttle valve 10 may be fully opened irrespective of an operated quantity of the accelerator pedal and the stroke and/or opening/closing timing of the intake valve 16 may be controlled as a function of the operated quantity of the accelerator pedal.

Figure 25:
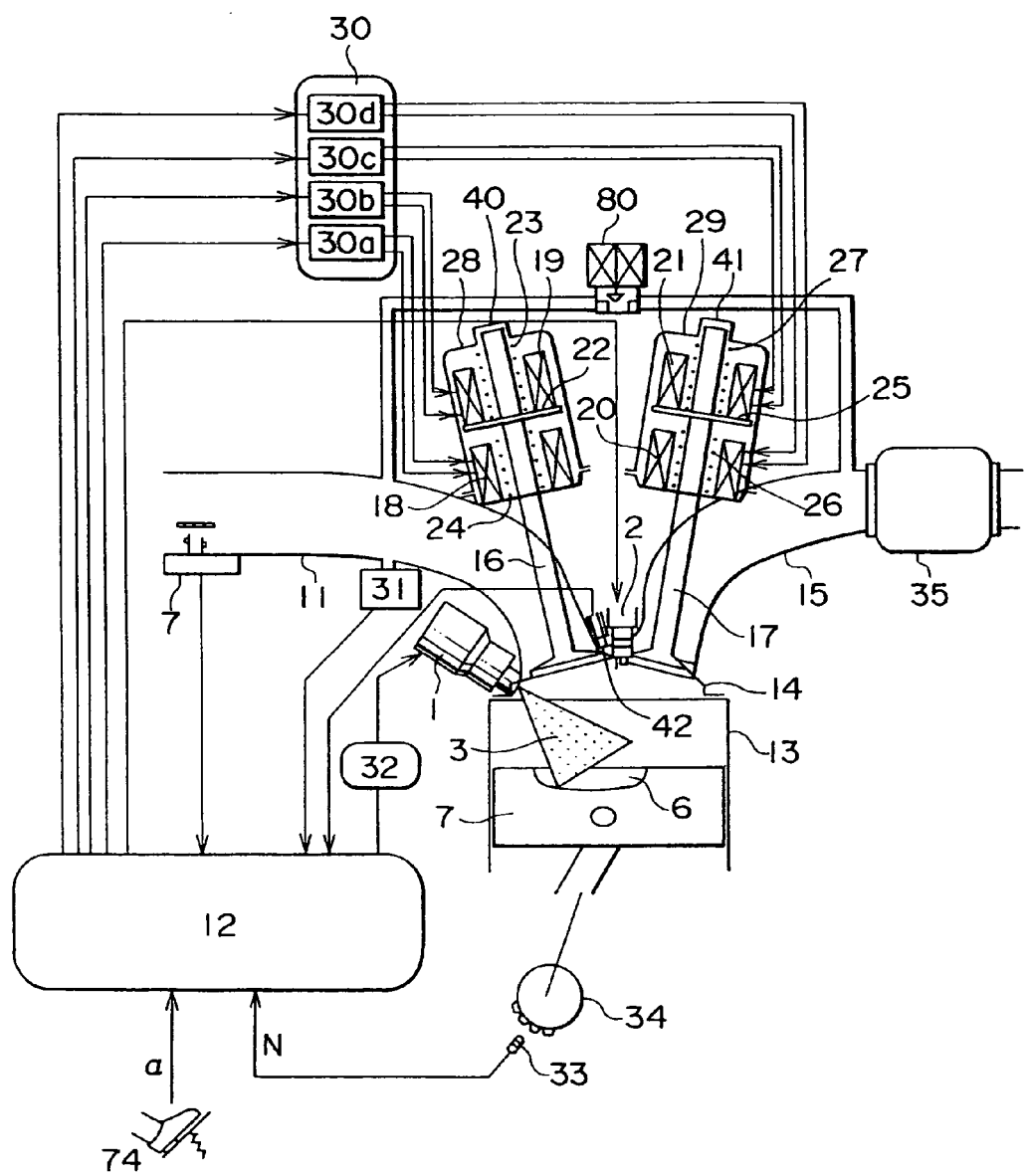
FIG. 25 is a system diagram showing a still further embodiment of the present invention.

Further, where the stroke and/or opening/closing timing of the intake valve 16 are controlled over the whole operational region of the engine, the throttle valve 10 may be omitted as in the system shown in FIG. 25.

In this case, the throttle valve 10 may also be used as a traction control valve. To be more specific, the control of air flow according to an operated quantity of the accelerator pedal is performed by the intake valve 16, while upon occurrence of skidding of a wheel, the throttle valve 10 is closed to suppress the engine output torque and prevent wheel skidding, irrespective of an operated quantity of the accelerator pedal, that is, irrespective of in what state the intake valve 16 is controlled. In this case, therefore, the throttle valve 10 assumes a fully open position in normal condition.

Figure 4:
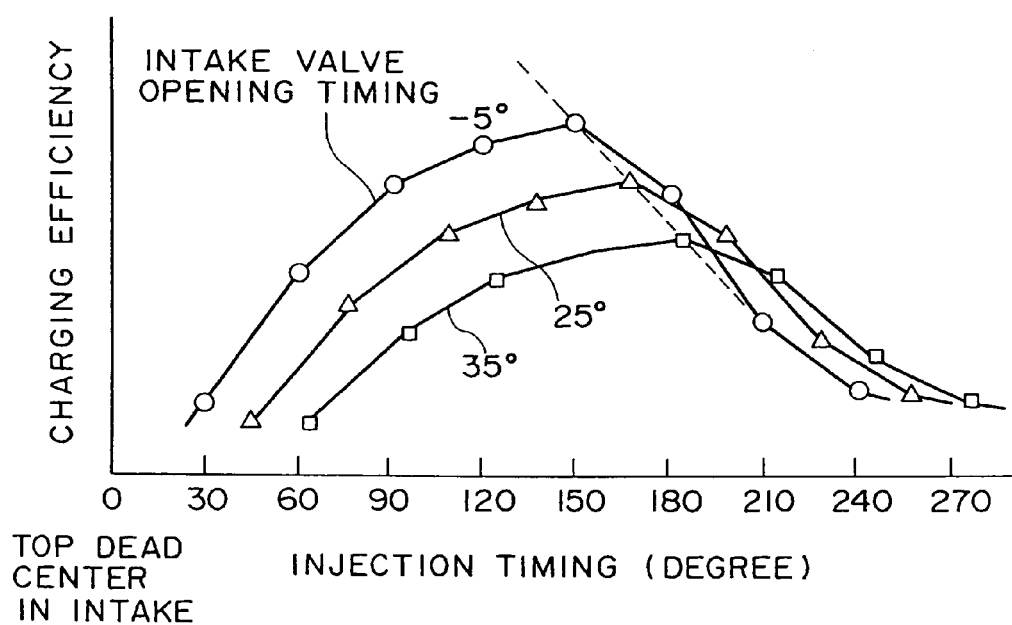
FIG. 4 is a diagram showing a relation among a fuel injection timing, an intake valve opening timing, and a charging efficiency.
Figure 5A:
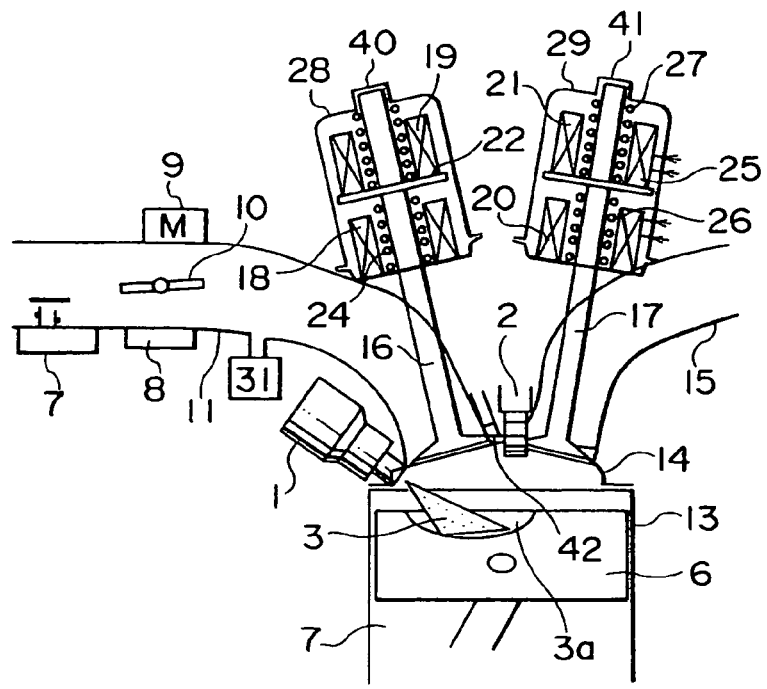
FIGS. 5A and 5B are diagrams for explaining a charging efficiency improving operation.
Figure 5B:
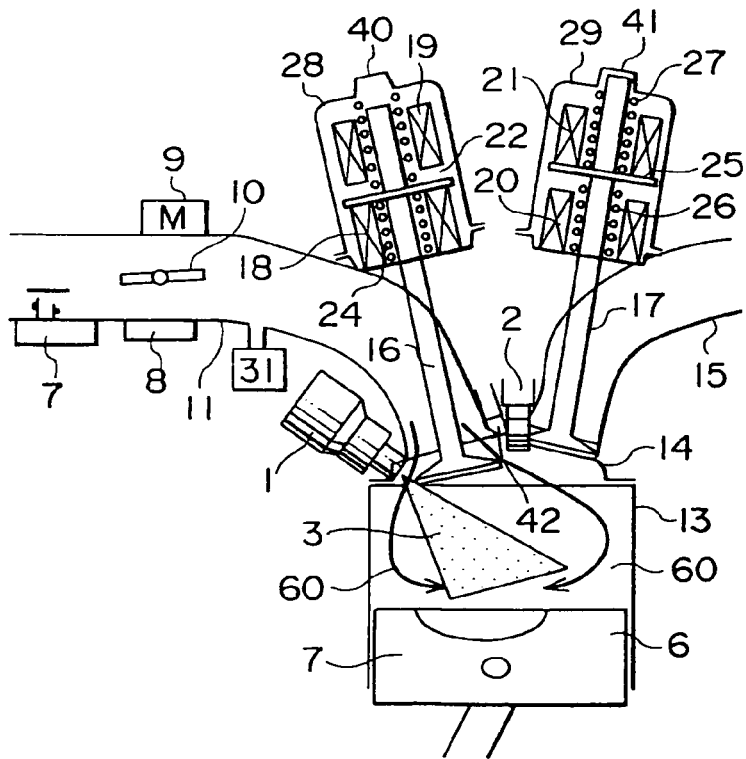

FIG. 4 shows a fuel injection timing and an intake charging efficiency, from which it is seen that the higher the charging efficiency, the more efficient the intake of air. If the fuel injection timing is varied at an intake valve opening timing of −5°, a maximum efficiency is attained at a fuel injection timing of about 150°. This is because the intake air is cooled by the injected fuel, resulting in increase of the air density and permitting a larger amount of air to be introduced. As shown in FIG. 5A, if fuel is injected in the vicinity of a top dead center, a fuel spray 3 injected from the injector 1 strikes against a piston cavity 3a, with consequent evaporation on an upper surface of a piston 6. Thus, the evaporation heat of fuel is used for cooling the piston. On the other hand, as shown in FIG. 5B, if fuel is injected at a lowered timing of the piston 6, the fuel is evaporated by air 60 which is introduced through the intake valve, so that the evaporation heat is used for cooling the air. Consequently, the charging efficiency during intake is improved. As shown in FIG. 4, if the timing of opening the intake valve 16 is delayed, the inflow of air through the intake valve is also delayed, so by controlling the fuel injection timing interlockedly it is made possible to keep the charging efficiency high.

Figure 6:
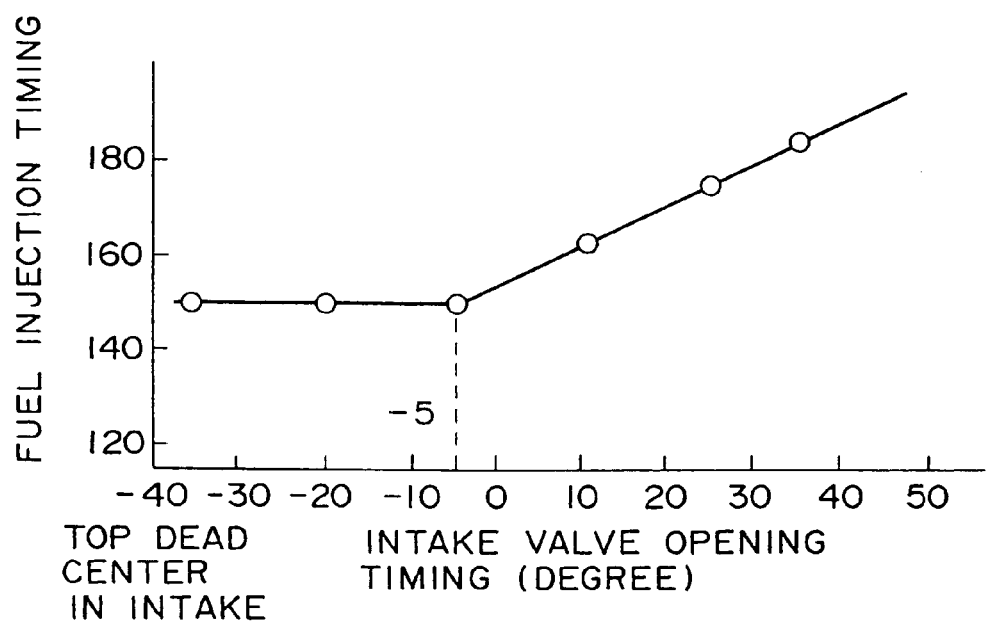
FIG. 6 is a graph showing a relation between an intake valve opening timing and a fuel injection timing for attaining a maximum charging efficiency.

FIG. 6 shows an example of relation between the intake valve opening timing and the fuel injection timing for keeping the charging efficiency high. By delaying the fuel injection timing with delay of the intake valve opening timing it is possible to keep the charging efficiency high.

Figure 7A:
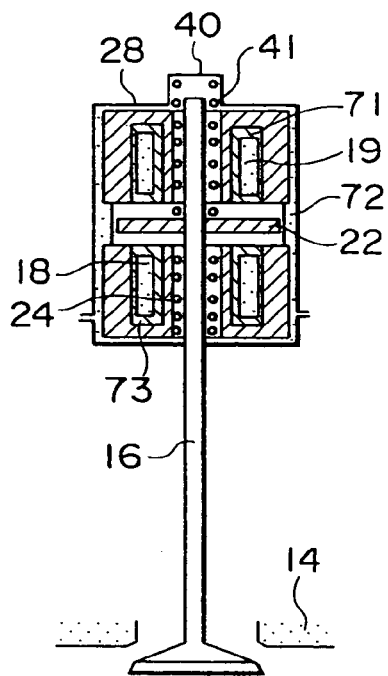
FIGS. 7A, 7B and 7C are diagrams for explaining a configuration of a variable valve and operations thereof.
Figure 7B:
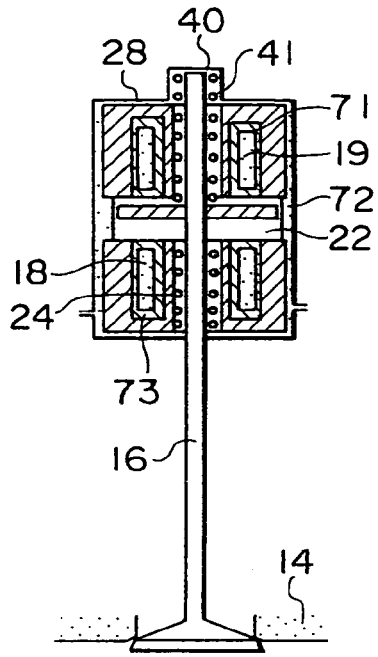
Figure 7C:
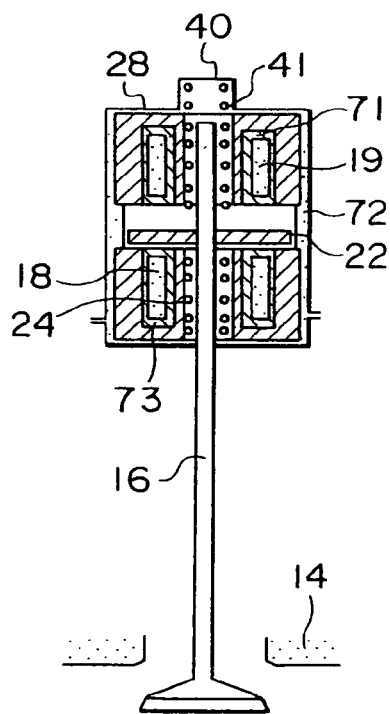

FIGS. 7A, 7B and 7C show an example of configuration of an electromagnetic type variable intake valve. Where no voltage is applied to the solenoids 18 and 19 as in FIG. 7A, the intake valve 16 is maintained in a neutral state by springs 24 and 23 through an armature 22. The solenoids 18 and 19 are received in yokes 75 and 76 through bobbins 71 and 73 disposed around the solenoids. A cover 28 mounted around the yokes 75 and 76 to fix the yokes.

When voltage is applied to the solenoid 19 as in FIG. 7B, the armature 22 is pulled up and the intake valve 16 opens. If the application of voltage to the solenoid 19 is stopped and voltage is applied to the solenoid 18, as in FIG. 7C, the intake valve is closed with the force of a spring 41 and with the electromagnetic force of the solenoid 18.

FIG. 8 shows an example of control for valve lift and for the voltage to be applied to each of the solenoids 18 and 19. The valve is closed by applying voltage to the solenoid 19 and not applying voltage to the solenoid 18, while it is opened by applying voltage to the solenoid 18 and stopping the application of voltage to the solenoid 19. By thus controlling the application of voltage to the solenoids it is possible to control the opening and closing of the valve at a high speed.

Figure 9:
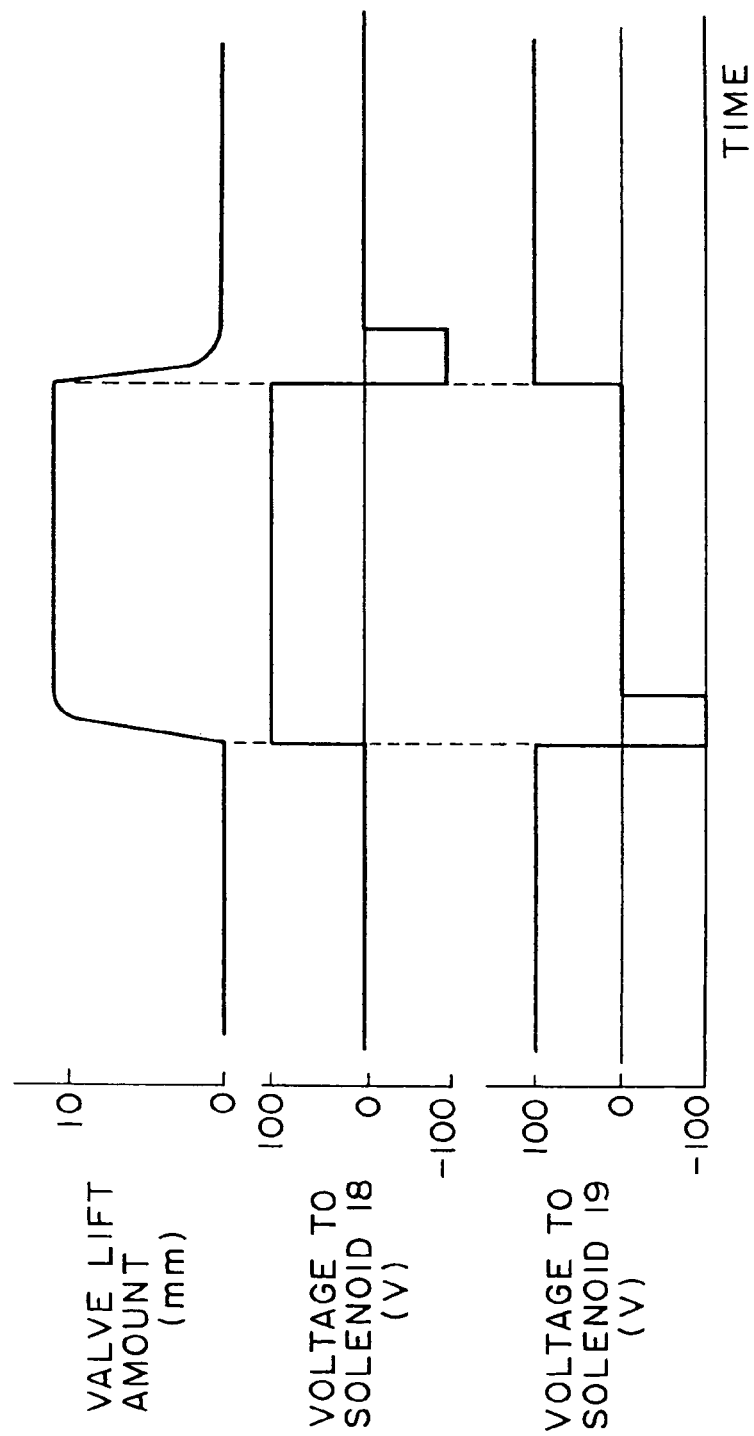
FIG. 9 is a diagram for explaining another method for actuating the variable valve.

FIG. 9 shows another voltage controlling method. For opening the valve, not only voltage is applied to the solenoid 18, but also voltage is applied to the solenoid 19 reversely to the voltage being applied to the solenoid 19 to eliminate the electromagnetic force of the solenoid 19 more quickly, whereby it is possible to shorten the time for opening the valve. Also in case of closing the valve, a negative voltage is applied to the solenoid 18, causing the valve to be closed more quickly.

FIG. 10A shows a voltage applying method for opening the valve quickly. An electric resistance of the solenoids is set relatively small and a peak current Ip and a holding current Ic to be applied to the solenoids are controlled. By the provision of a large peak current in a short time the responsiveness of the valve is improved and the heat generation of the solenoids is suppressed. As shown in FIG. 10B, the solenoid 18 is applied with voltage in a negative direction to quicken and minimizing the electromagnetic force of the solenoid 18 and is controlled its peak current and holding current.

FIG. 11 shows a torque controlling method for each cylinder according to the present invention. In the prior art, one or two throttle valves 10 attached to a joining portion (usually one or two main intake pipes laid between a surge tank and an air cleaner) of intake pipes are controlled by the accelerator opening sensor 74 to control the amount of air to be introduced into the engine 13. In the present invention, the intake valve 16 disposed for each cylinder is controlled in accordance with an accelerator opening sensor signal, thereby controlling for each cylinder the amount of air to be introduced into the engine.

Figure 12:
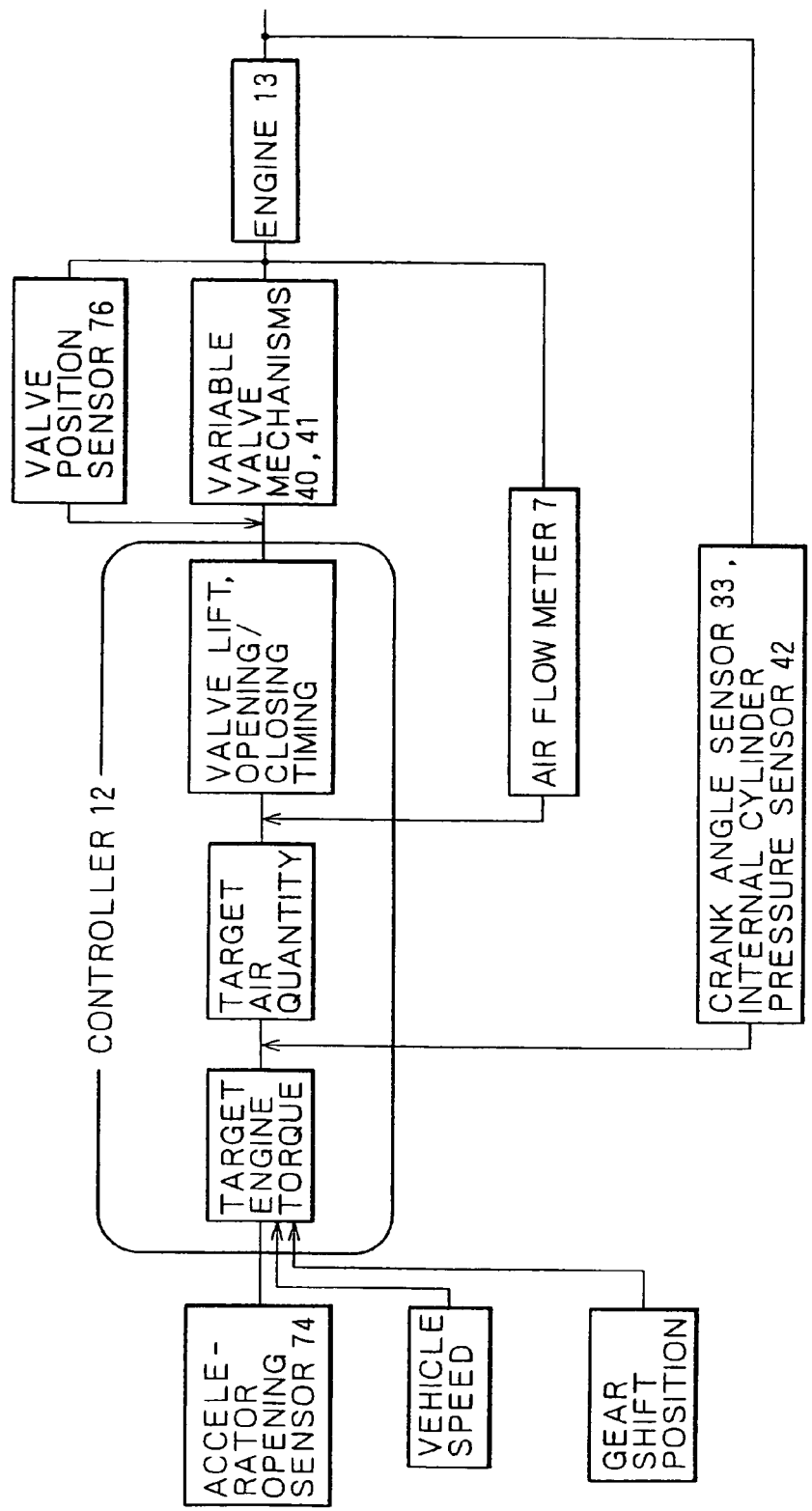
FIG. 12 is a block diagram of an embodiment of the present invention.

FIG. 12 shows a configuration according to the present invention. A target engine torque is calculated in accordance with the signal provided from the accelerator opening sensor 74, vehicle speed, and gear shift position. Then, in accordance with the target engine torque, a target air quantity is determined and there are calculated an intake valve lift (stroke) and an opening/closing timing. The variable intake valve mechanism 40 is controlled with the thus-calculated intake valve lift and opening/closing timing as target values to control the amount of air to the engine 13 for each cylinder. The intake valve position is detected by an intake valve position sensor 76 and a feedback control is made as to whether on-off control is made at the target intake valve position and target-timing. As to the amount of air introduced into the engine 13, the amount of air for each cylinder is detected by the air flow meter 7 and a comparison is made to check whether the detected amount of air corresponds to the target amount of air, making a feedback control. Further, the output torque of the engine is detected by the crank angle sensor 33 or the internal cylinder pressure sensor 42 and a comparison is made to check whether the detected output torque corresponds to the target engine torque, making a feedback control. In case of using the internal cylinder pressure sensor 42, the amount of air in each cylinder can be detected from the internal cylinder pressure after closing of the intake valve 16, so the air flow meter may be omitted.

Figure 13A:
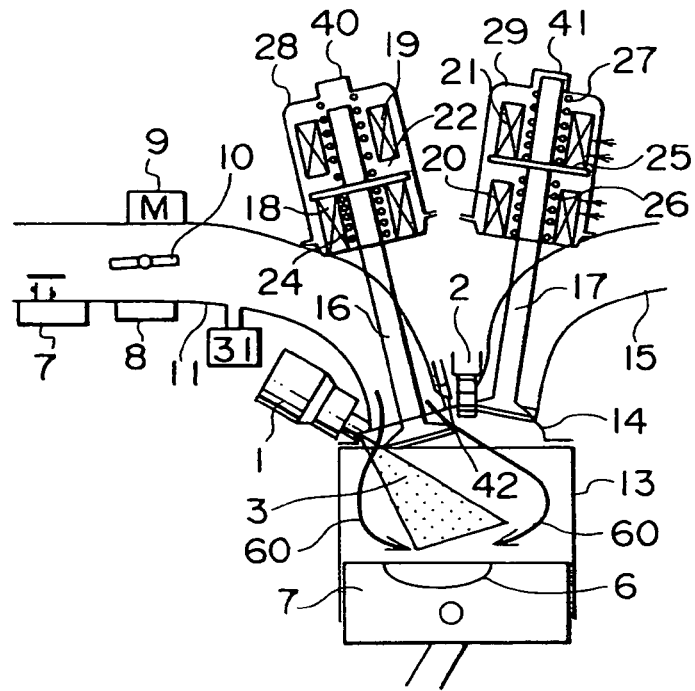
FIGS. 13A and 13B are diagrams for explaining operations in the embodiment.
Figure 13B:
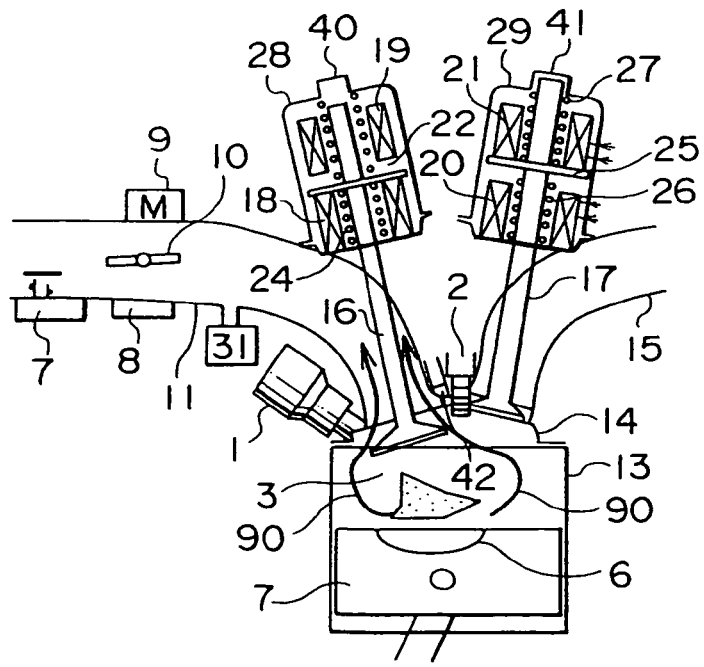

FIG. 13A shows in what state air flows into each cylinder in the suction stroke. Air 60 is sucked into the cylinder through the intake valve. As shown in FIG. 13B, if the intake valve 16 remains open until the beginning of compression, the exhaust gas which has remained in the cylinder in the exhaust stroke flows in reverse through the branch pipe and acts as internal EGR. The higher the internal pressure of the cylinder at an opening timing of the intake valve 16, the larger the amount of exhaust gas flowing in reverse and the more active the internal EGR.

FIG. 14 shows signals in the reverse flow detection type air flow meter 7. The amount of air sucked into each cylinder and the amount of reverse flowing air are detected in synchronism with the suction stroke of each cylinder. The amount of air introduced into the engine can be determined as Q1-Q2. The reverse flow rate is correlated with the volume of internal EGR.

Figure 15:
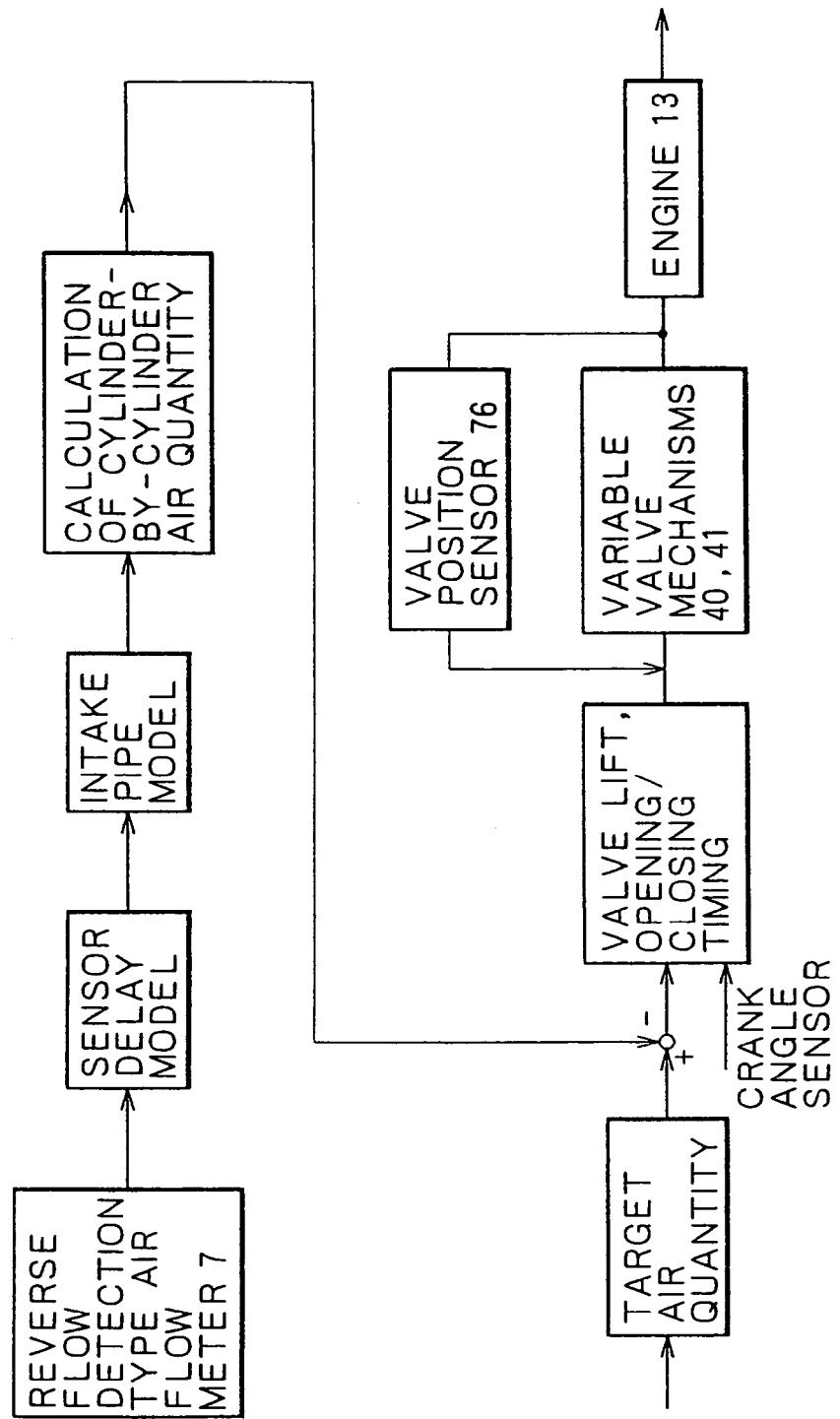
FIG. 15 is a block diagram of another embodiment of the present invention.

FIG. 15 is a block diagram of an air flow control. The air flow signal provided from the reverse flow detection type air flow meter 7 is compensated using a sensor delay model and an intake pipe delay model and the amount of air to be introduced into each cylinder is calculated. The result of the calculation is compared with a target amount of air and the intake valve lift or intake valve opening/closing timing is controlled. In this way it is possible to control the amount of air for each cylinder.

FIG. 16 shows a relation between air flow meter signals Q2/Q1 and the internal EGR rate. It is seen that the larger the Q2/Q1, the larger the amount of reverse flowing air and that of internal EGR. Thus, the internal EGR can be controlled on the basis of Q2/Q1.

Figure 17:
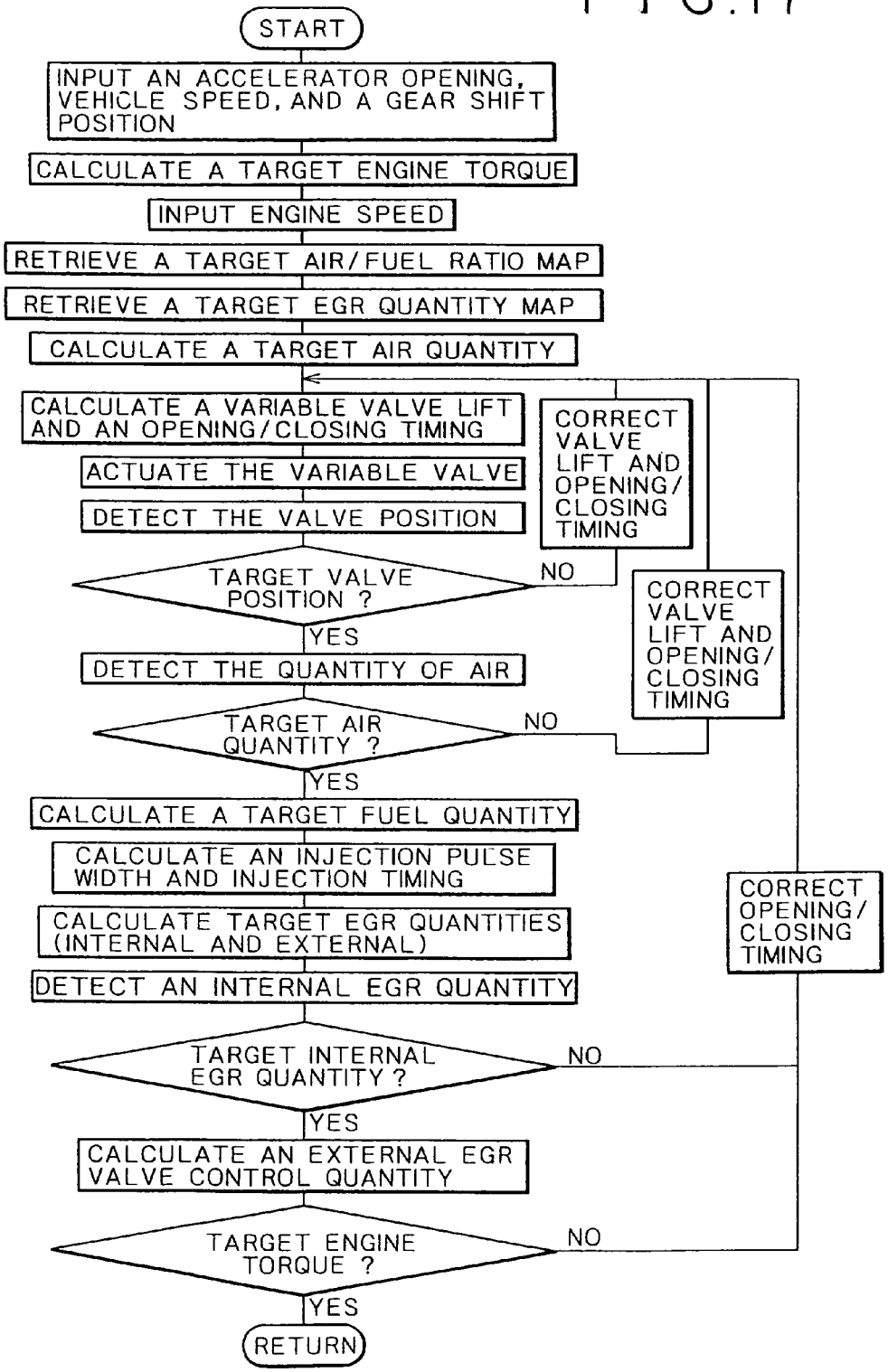
FIG. 17 is a flow chart embodying the present invention.

FIG. 17 shows an example of a flow chart. A target engine torque is calculated on the basis of an accelerator opening, vehicle speed, and a gear shift position. Further, the engine speed is inputted and a target air/fuel ratio map and a target EGR quantity map are retrieved from the target engine torque and engine speed. On the basis of these data there is determined a target air quantity and there are calculated an intake valve lift and an opening/closing timing. With the intake valve lift and opening/closing timing as a target, the variable intake valve mechanism 40 is controlled to control the amount of air to the engine 13 for each cylinder. The intake valve position is detected by the intake valve position sensor 76 and a feedback control to check whether opening and closing of the valve are controlled at the target intake valve position and timing. As to the amount of air introduced into the engine, it is detected for each cylinder by the air flow meter 7 and a comparison is made to check whether the detected amount of air corresponds to the target amount of air, making a feedback control. On the basis of this amount of air there is calculated an amount of fuel which satisfies the target air/fuel ratio, followed by calculation of the pulse width in fuel injection and a fuel injection timing. Further, target EGR quantities are calculated as target internal and external EGR quantities. An internal EGR quantity is detected on the basis of a signal provided from the reverse flow detection type air flow sensor or from the internal cylinder pressure sensor and is compared with the target internal EGR quantity, then if it is deviated from the target value, the intake valve opening/closing timing is controlled. As to the portion which remains short in the internal EGR, it may be controlled using an external EGR valve. Further, an engine output torque is detected by the crank angle sensor or the internal cylinder pressure sensor and a comparison is made to check whether the detected engine torque corresponds to the target engine torque, making a feedback control. In case of using the internal cylinder pressure sensor 42, the air flow meter 7 may be omitted because the amount of air in each cylinder can be detected from the internal cylinder pressure after closure of the intake valve 16.

Figure 18:
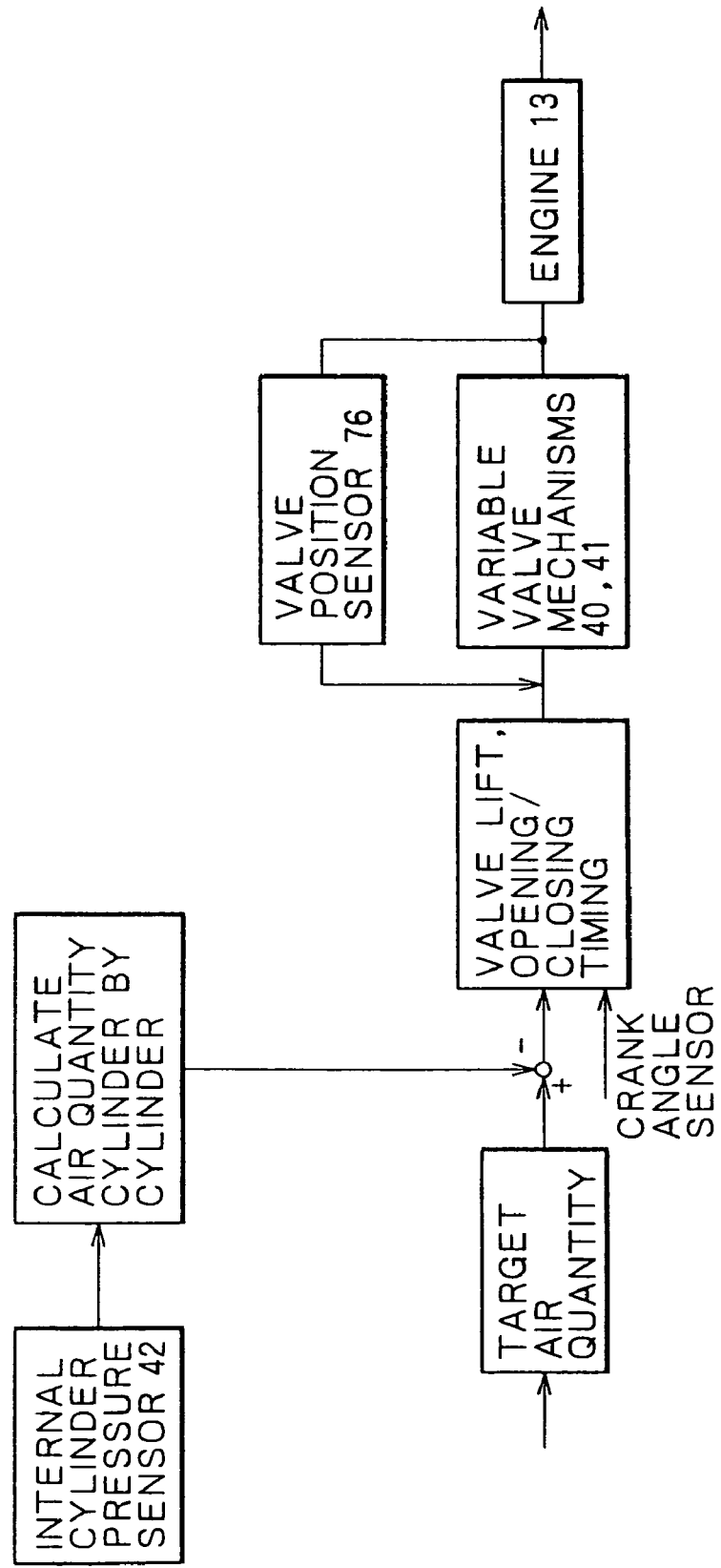
FIG. 18 is a block diagram of a further embodiment of the present invention.

FIG. 18 is a block diagram showing another example of an air flow control. Pressures at two or more timings in the compression stroke are detected by the internal cylinder pressure sensor 42 and the amount of air for each cylinder is calculated. The result of the calculation is compared with a target air quantity and the intake valve lift or intake valve opening/closing timing is controlled. In this way the amount of air can be controlled for each cylinder.

Figure 19:
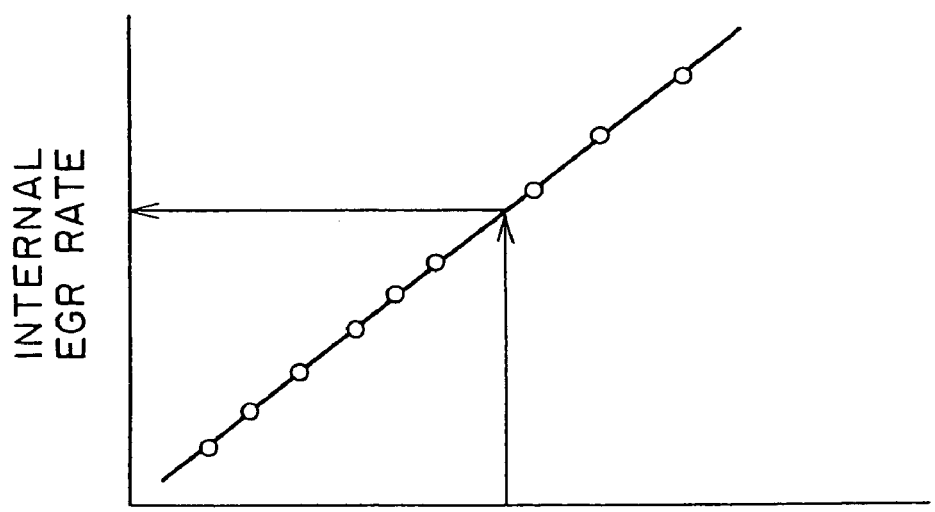
FIG. 19 is a diagram for explaining a relation between an internal cylinder pressure signal and an internal EGR rate.

FIG. 19 shows a relation between an internal cylinder pressure in a closed state of the exhaust valve 17 and the internal EGR rate. By detecting the internal cylinder pressure in a closed state of the exhaust valve 17, especially just before opening of the intake valve, it is possible to detect the amount of residual exhaust gas. The higher the internal cylinder pressure, the larger the amount of residual exhaust gas, that of reverse flow, and that of internal EGR, for the same volume. The internal EGR can be controlled on the basis of Q2/Q1. Numeral 41 denotes an exhaust mechanism.

Figure 20:
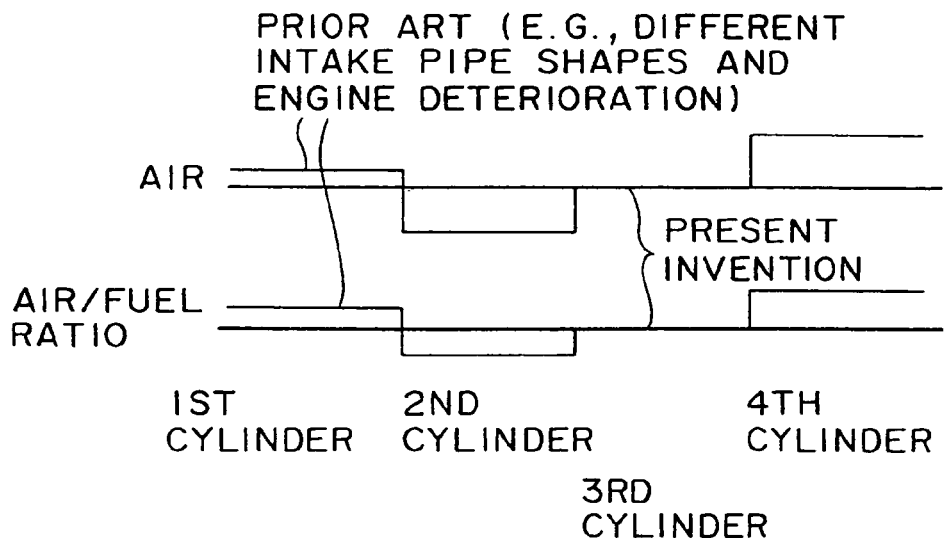
FIG. 20 is a diagram for explaining the amount of air and air/fuel ratio for each cylinder in the present invention and in the prior art.
Figure 21:
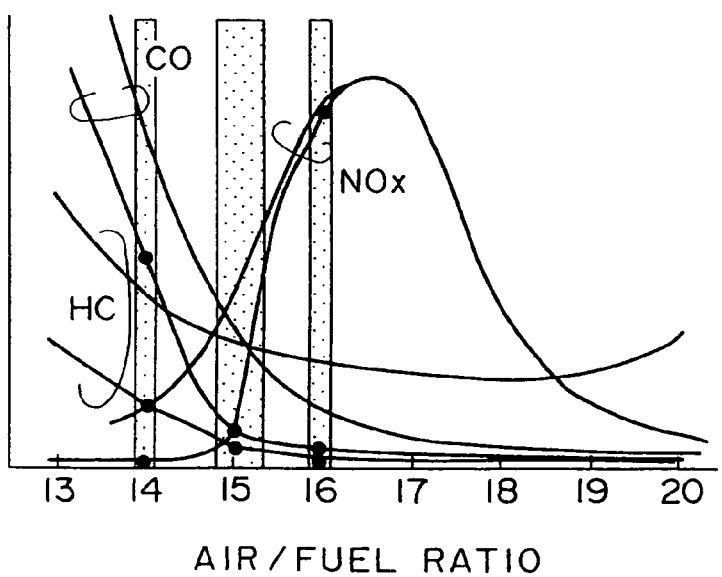
FIG. 21 is a diagram for explaining an exhaust gas composition obtained according to the present invention.

FIG. 20 shows an example of effect obtained by the present invention. In the prior art there sometimes occur variations in the amount of air for each cylinder caused by the shape of an intake pipe or by the deterioration of an engine. In this case, the fuel injection volume in each cylinder is adjusted so that the engine torque is equal among the cylinders used, thus giving rise to variations in the air/fuel ratio among the cylinders. As shown in FIG. 21, if the air/fuel ratio changes, such exhaust gas components as NOx, HC and CO may be discharged in larger quantities, or there may occur a drop from a high purifying efficiency of a three-way catalytic converter, leading to the discharge of harmful exhaust gas components in larger quantities. If a control is made to equalize the air/fuel ratio among the cylinders, there will be obtained engine torques different among the cylinders, thus leading to deterioration of the driving performance. In the present invention, the amount of air in each cylinder can be controlled independently by the throttle valve 10 and/or the variable intake valve 16, which are provided in each branch pipe, and therefore it is possible to make control so that the amount of air becomes equal among the cylinders irrespective of intake pipe shape and engine deterioration. Thus, since the engine torque in each cylinder can be controlled under the condition that the air/fuel ratio is equal among the cylinders, it is possible to make exhaust and driving performance compatible with each other.

Figure 22:
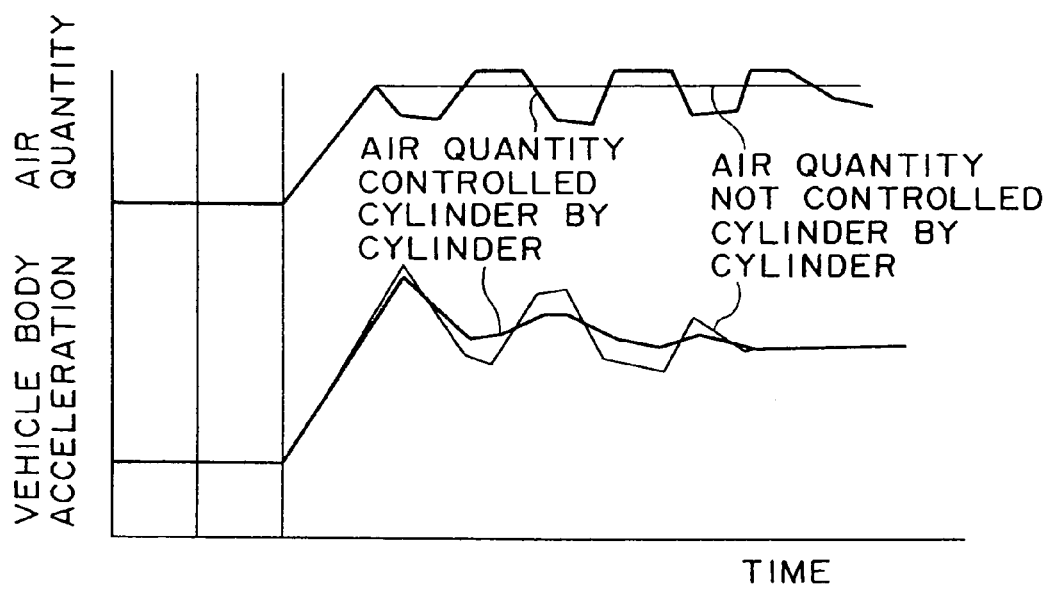
FIG. 22 is a diagram for explaining an effect obtained by applying the present invention to a transient control.

FIG. 22 shows an example of controlling the amount of air in acceleration. Upon depression of the accelerator pedal, all the cylinders will increase in the amount of air if the amount of air is not controlled for each cylinder, resulting in that the vehicle body acceleration becomes too high and there occur vibrations due to a torsional vibration of a driving shaft. This gives an unpleasant feeling to the driver. For example, there is known a method in which the ignition timing is controlled to control the engine output. According to this method, however, the state of exhaust and fuel economy may be deteriorated. In the case where the amount of air is controlled for each cylinder, the engine output can be controlled by controlling the amount of air and that of fuel for each cylinder so as to diminish the variation in vehicle body acceleration of the engine. In comparison with controlling the amount of air using a throttle valve disposed in a main intake pipe, there is no delay in the feed of air in the main intake pipe and the amount of air and that of fuel in each cylinder can be controlled by a variable intake valve and a direct fuel injector, thus permitting control for each cylinder.

Figure 23:
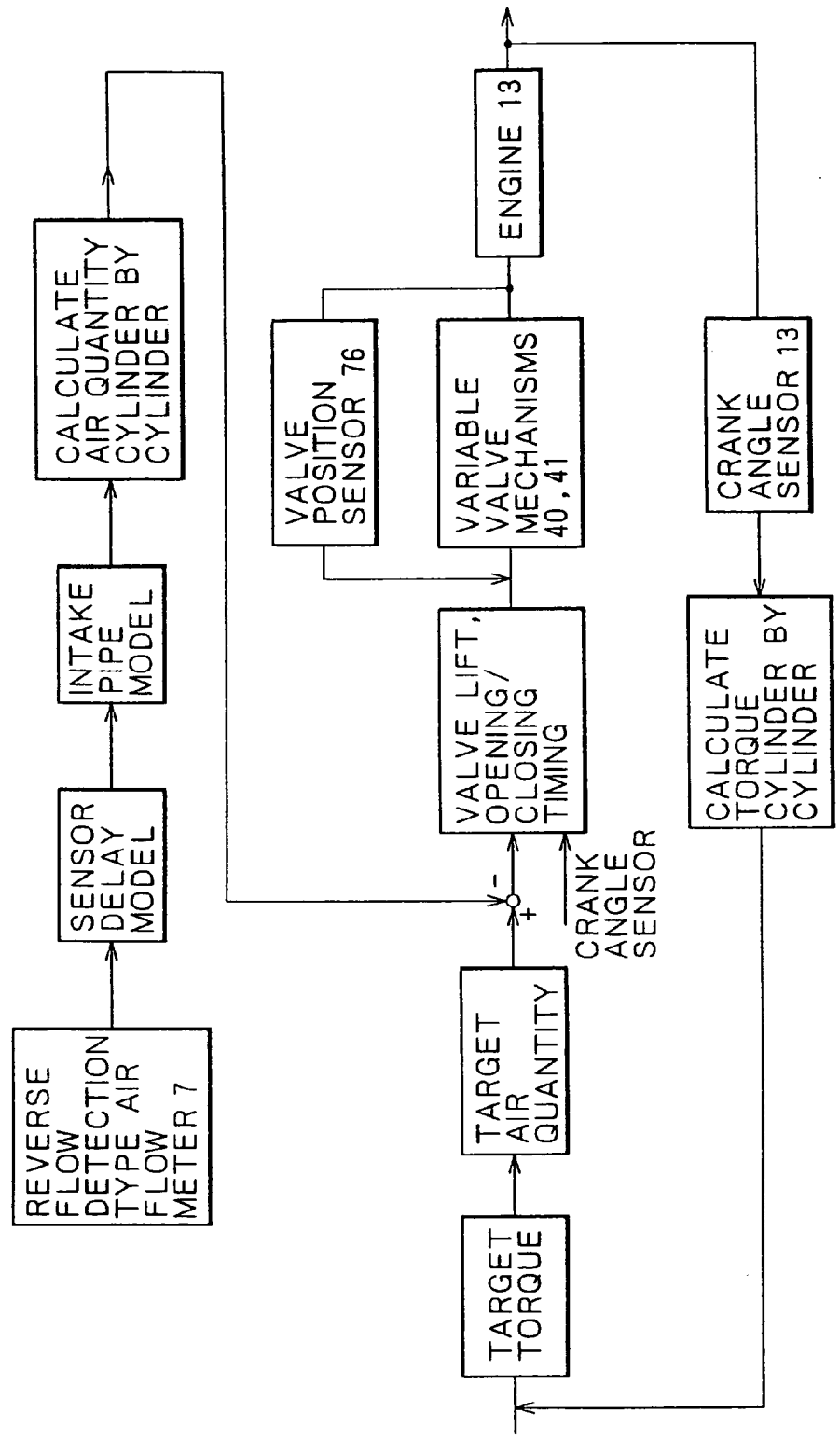
FIG. 23 is a block diagram showing a still further embodiment of the present invention.

Reference is now made to FIG. 23, which is a block diagram. The engine speed is detected by a crank angle sensor and the torque for each cylinder is calculated. A comparison is made to check whether this value corresponds to a target torque, and the intake valve lift and intake valve opening/closing timing are controlled. In a transient condition, acceleration feelings according to drivers' tastes can also be realized by establishing various target torques.

Figure 24:
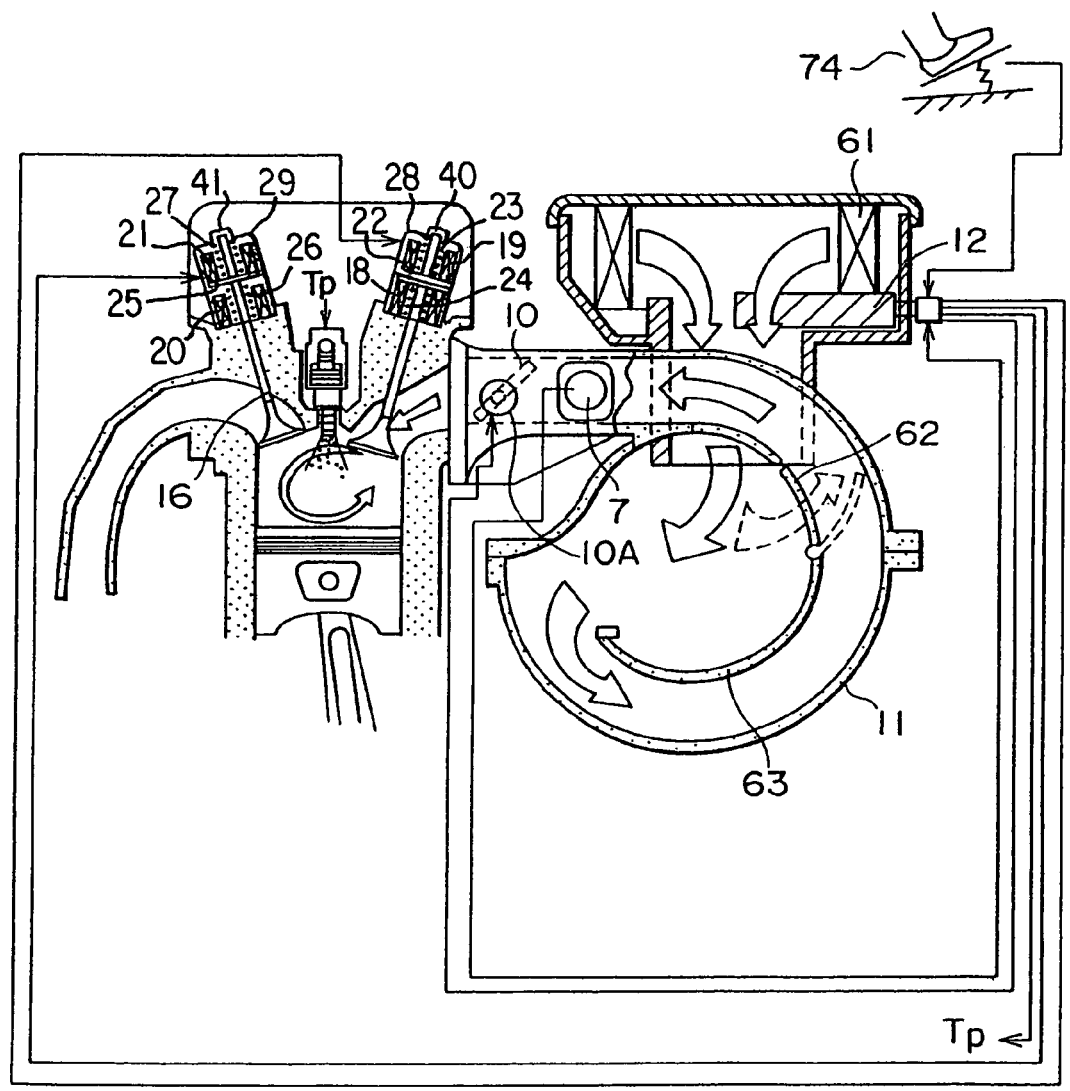
FIG. 24 is a diagram for explaining an example in which the invention is applied to an integral type intake system.

FIG. 24 shows an example in which the present invention is applied to an integral type intake system. In this integral type intake system, indicated at 11, an air cleaner 61, an air flow sensor 7, a throttle valve 10, and a throttle valve controlling motor 10A are made integral with a surge tank 63. By the addition of the variable intake valve 16 and throttle valve 10 according to the present invention there no longer is used such a throttle valve in the main intake pipe portion as in the prior art, and the amount of air can be controlled independently for each cylinder, so that it is no longer required to adjust the shape of each intake pipe and distribute air into equal quantities. Consequently, the degree of design freedom for the intake system is enhanced and it becomes easy to constitute the intake system compactly. Numeral 62 denotes an intake length control valve which makes control to enlarge or shorten the intake length like broken lines according to operating conditions of the engine.

In the prior art, a throttle valve is disposed in a main intake pipe located upstream of a joining portion of branch pipes to control the amount of air to be introduced into the engine. However, if the size of each intake pipe is reduced for the reduction of weight, the shape of the intake pipe is restricted and this restriction, as well as the deterioration of engine, give rise to a problem that the amount of air required for each cylinder is different.

On the other hand, in this embodiment of the present invention, the amount of air to be introduced into each cylinder can be adjusted accurately by controlling the air flow control valve (one or both of the throttle valve 10 and the intake valve 16 provided in each intake port) in accordance with an operated quantity (say, displacement) of the accelerator pedal. Besides, since the distance between 0the air flow control valve and the cylinder can be made short, it is possible to diminish variations in the amount of air and pumping loss caused by the difference in shape of intake passages.

In the conventional torque control for each cylinder, the difference in output torque among cylinders is compensated by adjusting the amount of fuel to be injected, so there arise variations in the air/fuel ratio among cylinders. Consequently, the state of exhaust gas discharged from the engine becomes worse and the use at a low catalytic efficiency obstructs a satisfactory purification of exhaust gas. Therefore, for equalizing the cylinders in the amount of air introduced therein, there arise restrictions in the shape of intake pipes, which is an obstacle to the attainment of size reduction.

An ultra-lean burn operation by a cylinder-direct fuel injection engine is effective for the improvement of fuel economy. In such an engine, the throttle valve is opened as large as possible to decrease the pumping loss. In a lean burn operation, however, a three-way catalytic converter is not employable, so it becomes necessary to decrease the amount of NOx in lean operation. For the decrease of NOx, not only the development of an effective catalyst but also EGR is effective. Particularly, the addition of much EGR is possible in cylinder-direct fuel injection and, because of operation in an open condition of the throttle valve, the internal pressure of each intake pipe approaches the atmospheric pressure and the difference between the exhaust pressure and the intake pressure becomes small. For these reasons there arises a problem that a pipe for EGR which connects the exhaust pipe and the intake pipe, as well as an EGR control valve, become larger in size. To solve this problem, studies are being made about a method of adjusting the opening/closing timing of the intake/exhaust valves, thereby controlling the internal EGR and decreasing NOx. However, since the valve opening/timing is controlled using a map to control the internal EGR, it is difficult to effect a highly accurate internal EGR control.

According to this embodiment of the present invention, since the amount of fuel is controlled in an independent manner, it becomes possible to control the engine torque for each cylinder without deteriorating the emission of exhaust gas. Moreover, it is possible to improve the control accuracy for the internal EGR.

In this embodiment, there are used a torque detecting means for each cylinder in the engine and an air quantity/fuel quantity control means for controlling the torque for each cylinder, an air flow control valve for controlling for each cylinder the amount of air to be introduced into each cylinder is disposed upstream of each intake port, and the air flow control valve is varied according to the degree of opening of the accelerator pedal to control the amount of air, thereby controlling the engine output torque. Further, the amount of air introduced into each cylinder is detected by a reverse flow detection type air flow sensor, and in accordance with an output signal provided from the said sensor the on-off condition of the air flow control valve is feedback-controlled, whereby the accuracy of the air flow control made by the air flow control valve can be improved.

Further, a more accurate EGR control can be attained by controlling the intake valve opening/closing timing in accordance with signal provided from the reverse flow detection type air flow sensor which detects a reverse flow including internal EGR from the engine. One reason why the fuel economy is not improved in an internal combustion engine is that there still remains a pumping loss in a low and medium load region. Another reason is that in a high load condition the air/fuel ratio is set to an overrich value relative to the stoichiometric air/fuel ratio. In this embodiment, while the pumping loss in a low and medium load condition is diminished to a great extent, the occurrence knocking can be suppressed even if the air/fuel ratio is set lean in a high load condition.

According to this embodiment, as described above, since the amount of air can be controlled accurately for each cylinder, there is no fear of worsening of the exhaust emission even if there is made a lean burn control or an ultra-lean burn control.

Moreover, since the output torque for each cylinder can be controlled more accurately, the total engine output is improved.

Further, it is possible to decrease the pumping loss in the air passage between the air flow control valve and each cylinder.

Additionally, if there is used a reverse flow detection type air flow sensor which detects a reverse flow including internal EGR from the engine and the intake valve opening/closing timing is controlled in accordance with a signal provided from the said sensor, it is possible to control the internal EGR with a high accuracy.

The invention claimed is:

1. A method for controlling an output torque of an internal combustion engine in accordance with the degree of opening of an accelerator pedal, comprising controlling at least one of opening/closing timing and stroke of at least one of intake and exhaust valves in an engine in accordance with a determined amount of air required for each cylinder of the internal combustion engine, controlling said output torque in accordance with the on-off condition of each intake valve provided in the engine, and operating a motor-driven throttle valve arranged in each branch passage of the internal combustion engine such that the required amount of intake air is controllable by each intake valve and said throttle valve, wherein in a low load region said throttle valve is fully opened irrespective of an operated quantity of the acceleration pedal, and at least one of the stroke and opening/closing time of each said intake valve is controllable as a function of the operated quantity of the accelerated pedal.

2. A method for controlling an output torque of an internal combustion engine in accordance with the degree of opening of an accelerator pedal, comprising controlling at least one of opening/closing timing and stroke of at least one of intake and exhaust valves in an engine in accordance with a determined amount of air required for each cylinder of the internal combustion engine, controlling said output torque in accordance with the on-off condition of each intake valve provided in the engine, and operating a motor-driven throttle valve arranged in each branch passage of the internal combustion engine and upstream of each intake port of the internal combustion engine to control intake air to each cylinder of the internal combustion engine, wherein an internal cylinder pressure sensor for detecting an internal cylinder pressure is provided and the on-off condition of the intake valve is feedback-controlled in accordance with an output signal provided from said internal cylinder pressure sensor.

3. A method for controlling an output torque of an internal combustion engine in accordance with the degree of opening of an accelerator pedal, comprising controlling at least one of opening/closing timing and stroke of at least one of intake and exhaust valves in an engine in accordance with a determined amount of air required for each cylinder of the internal combustion engine, controlling said output torque in accordance with the on-off condition of each intake valve provided in the engine, and operating a motor-driven throttle valve arranged in each branch passage of the internal combustion engine and upstream of each intake port of the internal combustion engine to control intake air to each cylinder of the internal combustion engine, wherein a torque sensor for detecting a rotational torque of the engine is provided and the on-off condition of an intake valve is controlled in accordance with an output signal provided from said torque sensor.

4. An apparatus for controlling the torque of an internal combustion engine including an injection which directly injects fuel into a cylinders, comprising:

branch pipes connected respectively to intake ports in the cylinders to feed air to the cylinders;

a main intake pipe connected to an upstream side of said branch pipes to introduce air to the branch pipes;

a reverse flow detection type air flow sensor disposed in said main intake pipe and capable of measuring an amount of air flow through each said branch pipe, including the amount of air reverse flowing through the branch pipe;

an intake valve arranged downstream of each said branch pipe and disposed in an intake port of each cylinder;

a torque measuring means for measuring an output torque of the engine;

a motor-driven throttle valve arranged in each said branch pipe so as to control at least one of opening/closing timing and stroke of the intake valve of each cylinder such that an amount of air to be supplied to the cylinders is controllable by said intake valve and said throttle valve; and a throttle valve opening compensating means for compensating the degree of opening of said throttle valve in accordance with a variation in output of said torque measuring means to adjust the amount of air flowing through each said branch pipe.

5. An apparatus for controlling an internal combustion engine which includes an injector configured to directly inject fuel into cylinder and which is operated by introducing air from intake ports of the cylinders, comprising:

a variable intake valve arrangement associated with each of the cylinders, a motor-driven throttle valve provided in each branch passage and upstream of each intake port such that the required amount of air to be introduced into each of the cylinders may be controllable by the respective intake valve arrangement and said throttle valve at each cylinder, and an intake length control valve which makes control to enlarge or shorten the intake length.

* * * * *